Patented Dec. 1, 1942

2,303,607

UNITED STATES PATENT OFFICE 2,303,607

TARTARIC ACID PRODUCTION FROM CALCIUM TARTRATE

Geza Braun, New York, N. Y., assignor to Standard Brands Incorporated, New York, N. Y., a corporation of Delaware No Drawing. Application August 3, 1940, Serial No. 351,166

4 Claims. (Cl. 260—536)

The invention pertains to a process for the manufacture of tartaric acid. More particularly, it relates to a procedure in which tartaric acid is produced from calcium tartrate, and includes correlated improvements and discoveries whereby such production may be effectively accomplished.

The production of tartaric acid, which involves preparation of calcium tartrate as an intermediate product, entails treatment of such calcium tartrate with sulfuric acid. Heretofore the tartaric acid solutions which were obtained in this manner were concentrated without any additional treatment in order to bring about crystallization, and hence the first product was a crude tartaric acid which required purification by recrystallization.

An object of the present invention is to provide a procedure in which tartaric acid may be produced in crystalline form and in pure condition in a single operation.

A further object of the invention is to provide a process for the preparation of tartaric acid from calcium tartrate, which obviates a crystallization in impure or crude form.

A still further object of the invention is the provision of a process in accordance with which tartaric acid may be produced by acid treatment of a calcium tartrate, and in a manner which may be readily, economically and efficiently conducted commercially.

A more specific object of the invention is the provision of a process in which a tartaric acid solution is first treated to remove calcium and sulfuric acid or sulfate content, and then decolorizing with obtainment of a clear solution from which tartaric acid in pure form crystallizes.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention tartaric acid in pure form may be prepared by treating pure calcium tartrate with sulfuric acid whereby interaction leads to formation of tartaric acid and calcium sulfate. The amount of sulfuric acid used is slightly in excess of that required to react with the calcium tartrate, and there may be obtained a solution containing about 40% of tartaric acid. The solution so obtained may then be treated with a calcium salt, as calcium tartrate or calcium carbonate, and preferably at an elevated temperature, which may be in the neighborhood of about 75° C. This treatment is carried out until only a small amount of sulfuric acid remains, and then the iron content may be precipitated through the introduction of ferro-cyanic acid or a salt thereof.

The reaction mass is now filtered to remove precipitated calcium sulfate and Prussian blue, with obtainment of a clear solution having a light brown color. To this solution barium carbonate and oxalic acid may be added in calculated amounts to effect precipitation of the sulfuric acid or sulfate radical as barium sulfate and of the calcium as calcium oxalate. When the mass has been stirred for a few hours it may be filtered, and the filtrate treated with a decolorizing carbon which gives, upon removal of the carbon, a water-clear filtrate from which tartaric acid may be separated in crystalline form. The tartaric acid so obtained is of high purity and contains only slight traces of impurities. This is shown by the fact that the ash content is only about 0.015 to 0.02%.

As an illustrative embodiment of a manner in which the invention may be practiced, the following description is presented. A 40% tartaric acid solution, obtained by treatment of calcium tartrate of a relatively high purity with sulfuric acid in excess of the amount necessary to react to form tartaric acid, is treated with a calcium salt, which may be calcium tartrate or carbonate, at a temperature of about 75° C. until a very small amount of sulfuric acid remains. The reaction mass is stirred for a period until precipitation of calcium sulfate has ensued, and then iron may be precipitated with ferro-cyanic acid or a salt thereof, which may be calcium, barium and the like. The iron reacts with the formation of Prussian blue which, together with the calcium sulfate, may be removed by filtration. A clear solution, light brown in color, is obtained as a filtrate, and to it there may be added barium carbonate or other barium compound and oxalic acid in calculated amounts, such that a precipitation of the calcium as oxalate and of the sulfuric acid or sulfate as barium sulfate will take place. In order to insure these precipitations the reaction mass may be stirred for a period of a few hours and the insoluble material removed by filtration.

The filtrate thus obtained may then be clarified by adding thereto a decolorizing carbon and with the solution at a temperature of about 75° C. Removal of the carbon may be effected in a suitable manner, as by filter pressing, and a water-clear filtrate containing tartaric acid is obtained.

If desired, this may be further concentrated under reduced pressure and crystallization permitted to take place. It has been noted at times that the concentrated solution shows a slight turbidity, when clarification is accomplished either by a centrifuge or a filter press. This turbidity, however, is not disadvantageous. The tartaric acid obtained as a product is substantially chemically pure, and contains only very small amounts of impurities. The ash content may be 0.015 to 0.02%. The acid produced may be further purified, if desired, by recrystallization. This, however, is usually not necessary, but when carried out the acid may be dissolved in water to a 66% solution which is clarified by decolorizing carbon and the acid then crystallized therefrom. An acid of very high purity is obtained in this manner, and the ash content may be as low as 0.0026 to 0.003%.

My researches have shown that a 40% tartaric acid solution gives distinctly satisfactory results. However, weaker or more concentrated solutions may be used, as may also tartaric acid solutions of lesser purity, which are obtained at various stages of the crystallizing procedure.

It will be realized that other ferro-cyanides may be utilized, and of these mention may be made of sodium, potassium and strontium ferro-cyanides. The use of one or another of these compounds will be governed by the particular conditions and results sought.

Inasmuch as the tartaric acid in accordance with the foregoing procedure is produced from calcium tartrate, it will be clear that the production of a pure calcium tartrate is of import for the obtention of tartaric acid of high purity. I have found that a calcium tartrate which has been prepared with inclusion of a washing in accordance with countercurrent procedure is of a satisfactory purity, and that the water soluble impurities do not exceed 0.5% calculated on the tartaric acid content. When such a calcium tartrate is reacted with sulfuric acid in slight excess a tartaric acid solution results containing only small amounts of impurities, and hence lends itself to the production of a pure crystalline tartaric acid in a single operation. Included among the impurities which are removed are iron, calcium sulfate, excess sulfuric acid, coloring matters, potassium salts, and other compounds which are present only in small amounts.

If merely a relatively pure tartaric acid is desired, this may be produced with a removal only of the coloring matter and iron from the calcium tartrate containing solution. My work, however, has shown that if calcium sulfate is not removed from the solution, it continues through the operations with the tartaric acid, and even a recrystallization thereof does not suffice to remove all of the sulfate. Further, the sulfate forms a crystalline crust in the evaporator during the evaporation phase and hence lowers the efficiency of heat transmission and at the same time some sulfate remains suspended in the concentrated acid, and must be removed, as by high speed centrifugal action preceding crystallization of the tartaric acid. Consequently, it is desirable that the impurities be removed from the calcium tartrate solution so that a pure tartrate may result therefrom and serve as the starting material in the production of a pure tartaric acid through interaction with sulfuric acid.

The tartaric acid which is utilized in the manufacture of pharmaceuticals should, of course, be free from objectionable impurities, and especially free from lead. The procedure herein outlined yields a tartaric acid meeting the highest requirements if the operations are conducted in lead-free equipment, since the acid thus obtained is lead-free, even though the raw materials may have been somewhat contaminated with lead.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for the production of tartaric acid which comprises reacting calcium tartrate with sulfuric acid to form a solution of tartaric acid, incorporating a reactive calcium salt therewith to remove sulfuric acid as calcium sulfate, precipitating the iron as a ferro-cyanide, filtering, treating the solution thus obtained with a barium salt and oxalic acid thus precipitating residual sulfate as barium sulfate and calcium as calcium oxalate, treating with a decolorizing carbon, separating solid from liquid, and crystallizing and recovering tartaric acid from the liquid thus obtained.

2. A process for the production of tartaric acid which comprises reacting calcium tartrate with sulfuric acid to form a solution of tartaric acid, incorporating a reactive calcium salt therewith at a temperature of about 75° C. until most of the sulfuric acid has been reacted with formation of calcium sulfate, precipitating the iron as a ferro-cyanide, filtering, treating the solution thus obtained with a barium salt and oxalic acid thus precipitating residual sulfate as barium sulfate and calcium as calcium oxalate, treating with a decolorizing carbon, separating solid from liquid, and crystallizing and recovering tartaric acid from the liquid thus obtained.

3. A process for the production of tartaric acid which comprises reacting calcium tartrate with sulfuric acid to form a solution containing about 40% tartaric acid, incorporating a reactive calcium salt therewith at a temperature of about 75° C. until most of the sulfuric acid has been reacted with formation of calcium sulfate, precipitating the iron as a ferro-cyanide, filtering, treating the solution thus obtained with a barium salt and oxalic acid thus precipitating residual sulfate as barium sulfate and calcium as calcium oxalate, treating with a decolorizing carbon, separating solid from liquid, and crystallizing and recovering tartaric acid from the liquid thus obtained.

4. A process for the treatment of tartaric acid which comprises reacting calcium tartrate with sulfuric acid to form a solution containing about 40% tartaric acid, incorporating calcium carbonate therewith at a temperature of about 75° C. until most of the sulfuric acid has been reacted with formation of calcium sulfate, precipitating the iron as a ferro-cyanide, filtering whereby a solution of tartaric acid is obtained, adding barium carbonate and oxalic acid to the clear solution in amounts sufficient to remove the sulfate radical as barium sulfate and calcium as calcium oxalate, again filtering, adding a decolorizing carbon to the filtrate thus obtained, heating at a temperature of about 75° C., separating solid and liquid, and crystallizing and recovering tartaric acid from said liquid.

GEZA BRAUN,